US010967417B2

(12) United States Patent
Page et al.

(10) Patent No.: US 10,967,417 B2
(45) Date of Patent: Apr. 6, 2021

(54) KEY BLANK STACK

(71) Applicant: KABA ILCO CORP., Rocky Mount, NC (US)

(72) Inventors: Christopher Dean Page, Nashville, NC (US); Deborah Johnson Parker, Elm City, NC (US); Allen Shelton Fisher, Nashville, NC (US)

(73) Assignee: KABA ILCO CORP., Rocky Mount, NC (US)

( * ) Notice: Subject to any disclaimer, the term of this patent is extended or adjusted under 35 U.S.C. 154(b) by 196 days.

(21) Appl. No.: 15/992,713

(22) Filed: May 30, 2018

(65) Prior Publication Data

US 2019/0076909 A1    Mar. 14, 2019

Related U.S. Application Data

(60) Provisional application No. 62/556,655, filed on Sep. 11, 2017.

(51) Int. Cl.

| B21D 43/22 | (2006.01) |
|---|---|
| B23C 3/35 | (2006.01) |
| B65D 85/62 | (2006.01) |
| B65D 71/50 | (2006.01) |

(52) U.S. Cl.
CPC ............... *B21D 43/22* (2013.01); *B23C 3/35* (2013.01); *B23C 2235/28* (2013.01); *B65D 71/50* (2013.01); *B65D 85/62* (2013.01)

(58) Field of Classification Search
CPC ... A45C 13/023; E05B 19/00; E05B 19/0017; E05B 19/0082; E05B 19/14; B65D 85/62; B23C 2235/28; Y10T 70/8703; Y10T 70/873; Y10T 70/8676
USPC .................................................. 206/38.1, 499
See application file for complete search history.

(56) References Cited

U.S. PATENT DOCUMENTS

| 1,958,442 A * | 5/1934 | Pechy ..................... | B21F 45/00 |
|---|---|---|---|
| | | | 72/405.03 |
| 5,311,758 A * | 5/1994 | Neitzke ................ | A45C 11/326 |
| | | | 206/37.1 |
| 2013/0331976 A1* | 12/2013 | Freeman ................ | G06Q 20/18 |
| | | | 700/117 |
| 2018/0079015 A1* | 3/2018 | Marsh .................. | G06K 9/4604 |

* cited by examiner

*Primary Examiner* — Steven A. Reynolds
*Assistant Examiner* — Javier A Pagan
(74) *Attorney, Agent, or Firm* — Norton Rose Fulbright US LLP

(57) ABSTRACT

A key blank loading cartridge includes a sleeve defining a cavity for holding a stack of key blades within a box of key blanks. The key blanks are releasably retained in the cartridge cavity by their blade portions leaving the head portions of the blanks exposed. After having been removed from the box, the so retained stack of key blanks is ready to be loaded as a single unit in a corresponding key blank magazine. Once the head portions of the key blanks have been engaged in the magazine, the sleeve can be pulled off the blanks and returned to the key blank manufacturer and reused in another key blank shipping package.

20 Claims, 3 Drawing Sheets

KEY BLANK STACK

CROSS-REFERENCE TO RELATED APPLICATIONS

This application claims priority from U.S. provisional patent application No. 62/556,655, filed Sep. 11, 2017, the entire content of each of which is incorporated by reference herein.

TECHNICAL FIELD

The application generally relates to key blanks and, more specifically, to key blanks handling, packaging and shipping.

BACKGROUND

A key blank dispenser or magazine has a plurality of key blanks stored therein. At regular intervals, new key blanks must be loaded into the dispenser. The loading process may be cumbersome because the key blanks are typically shipped loose in a box. Hence, the operator or employee must manually align the key blanks and load them in said magazine. To assist in the loading of the key blanks, a manual tool can be used to remove the contents of the box of blanks and load them into the magazine as one unit. While, the manual tool facilitates removal of the blanks from the box, it still necessitates the use of a separate tool. There is, thus, still a need to simplify and expedite the loading operation of the blanks into the magazine.

SUMMARY

In accordance with a general aspect, there is provided a packaging assembly for shipment of key blanks, comprising: a set of key blanks each having two faces spaced-apart by a thickness and defining a head portion and a blade portion; a sleeve having first and second pairs of opposed walls circumscribing a key blank compartment in which the blade portions of the key blanks are releasably engaged, the sleeve holding the set of key blanks into a stack along a stacking direction parallel to the first pair of opposed walls, the key blanks in the stack serially aligned in a coplanar relationship along the stacking direction to have one of the two faces of each of the key blanks facing one of two faces of an adjacent one of the key blanks.

In accordance with another general aspect, there is provided a key blank cartridge for loading key blanks in a key blank magazine, comprising a set of key blanks each having two faces spaced-apart by a thickness and defining a head portion and a blade portion, the cartridge assembly further comprising a sleeve configured to be held by an operator, the sleeve releasably receiving blade portions of the key blanks to hold the set in a stacked configuration along a stacking direction, the key blanks in the stacked configuration serially aligned in a coplanar relationship, the key blanks removable from the sleeve along a direction parallel to a longitudinal axis of the blade portions.

In accordance with another general aspect, there is provided a method of packaging key blanks for shipment, the method comprising: providing a sleeve having two perpendicularly opposed sets of walls defining a compartment; forming a ready-to-load stack of key blanks by inserting blade portions of the key blanks in the compartment thereby forming a stack in which the key blades are held in a coplanar relationship, the stack releasably retained in the compartment by the walls of the sleeve; and inserting the ready-to-load stack of key blanks in a box for shipment.

Many further features and combinations thereof concerning the present improvements will appear to those skilled in the art following a reading of the instant disclosure.

DETAILED DESCRIPTION

A key blank dispenser or magazine is configured to contain a plurality of key blanks. According to a particular application, the key blank magazine forms part of an automatic key cutting machine. Such machines, as for instance disclosed in U.S. Pat. No. 8,979,446 issued on Mar. 17, 2015, are configured to automatically duplicate a master key by reproducing the master key tooth pattern on a blade portion of a key blank of a same model as the master key. Such machines typically have a plurality of vertical key-blank magazines configured for receiving respective stacks of key blanks. The vertical channel of each key-blank magazine is shaped to match a shape of a head portion of the key blank such that each of the magazines can only receive one specific kind of key blanks.

Figure 1:
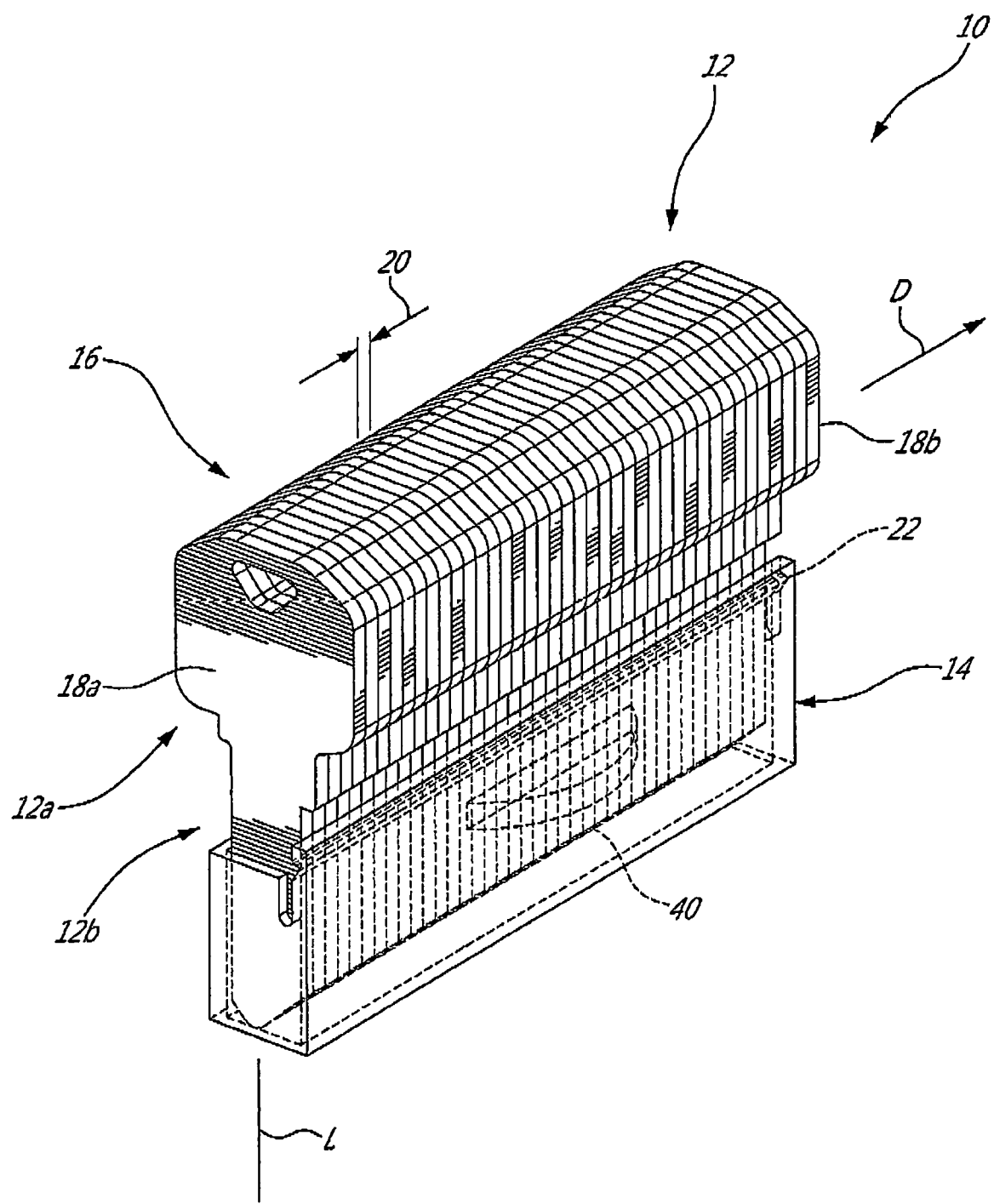
FIG. 1 is a schematic tridimensional view of a key blank packaging assembly, or key blank cartridge in accordance with a particular embodiment.

Referring to FIG. 1, to load such a magazine or dispenser, a key blank loading cartridge 10 is provided. As will be seen hereinafter, the key blank cartridge 10 is part of a packaging assembly for shipping key blanks, for example, to the operator of the key cutting machine. In the embodiment shown, the cartridge 10 comprises a set of key blanks 12 and a sleeve 14 configured for receiving the set of key blanks 12 along a stacking direction D to form a stack 16 of key blanks 12 ready to be loaded into a corresponding magazine without the use of any external tools. In the illustrated embodiment, the sleeve 14 is dimensioned for a specific kind of key blanks 12 and for receiving a specific number thereof. It is understood that the same sleeve may be used for different kind of key blanks and hence may contain more or less of key blanks depending of their thickness.

Still referring to FIG. 1, each of the key blanks 12 has two opposed faces 18a and 18b spaced-apart from one another by a thickness 20. The key blanks 12 each have a head portion 12a and a blade portion 12b protruding away from the head portion 12a. In the embodiment shown, the blade portions 12b define notches 22. In the sleeve 14, the key blanks are aligned in a coplanar relationship along the stacking direction D with the face 18b of a first key blank bearing against the face 18b of the next key blank. In other words, one of the two faces 18a and 18b of each of the key blanks 12 faces one of the two faces 18a-18b of an adjacent one of the key blanks 12. It is understood that not all key blanks define notches and that the sleeve 14 is designed accordingly.

As illustrated, the sleeve 14 is configured for receiving the blade portions 12b while leaving the key blank head portions 12a exposed for engagement with a corresponding magazine. Therefore, the operator may grab the cartridge 10 by the sleeve 14 to slide the key blade head portions 12a in the dedicated key-blank magazine. The sleeve 14 may then by removed by pulling it away from the key blanks 12 along a direction parallel to a longitudinal axis L of the key blank blade portions 12b. In this way, the key blanks 12 can be loaded all at once as a single unit into the magazine without the use of any external tools.

Figure 2:
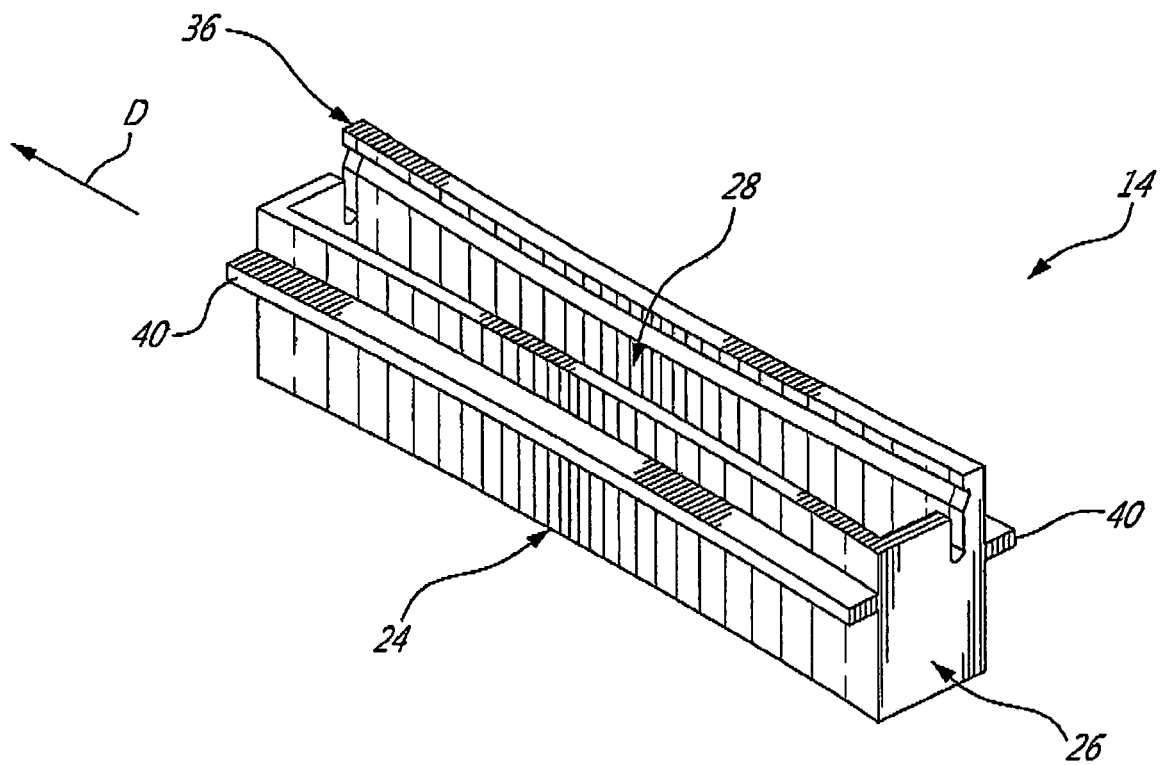
FIG. 2 is a schematic tridimensional view of a sleeve forming part of a key blank packaging assembly in accordance with a particular embodiment.
Figure 3:
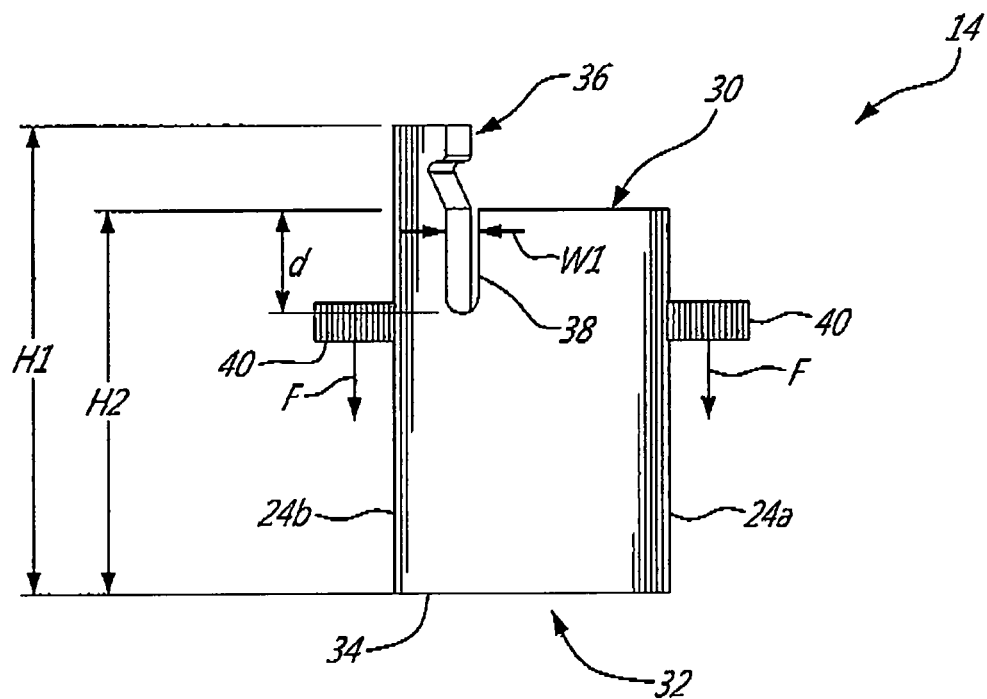
FIG. 3 is a schematic front elevation view of the sleeve shown in FIG. 2.
Figure 4:
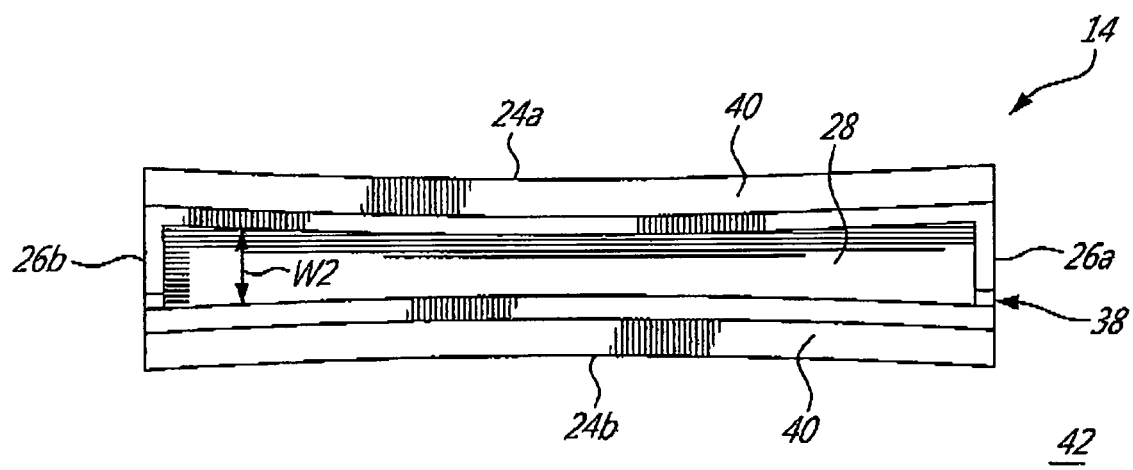
FIG. 4 is a schematic top elevation view of the sleeve shown in FIG. 2.
Figure 5:
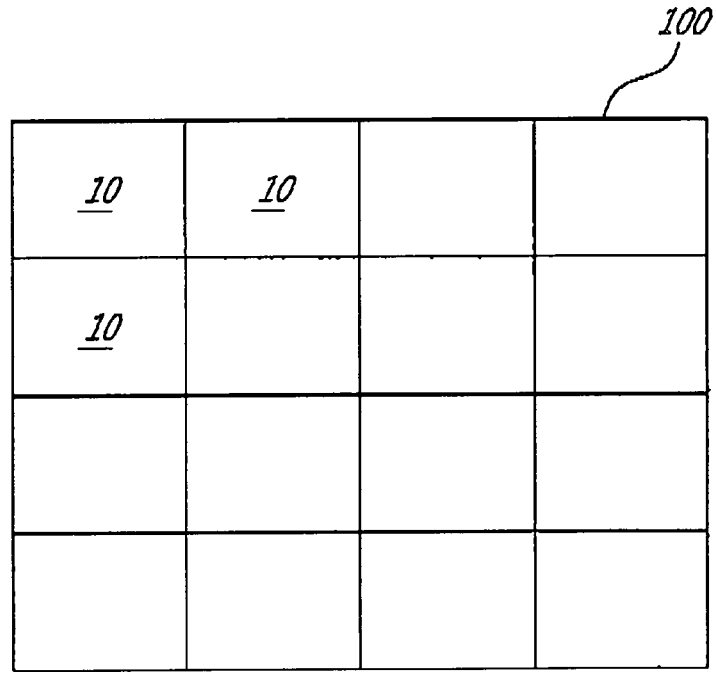
FIG. 5 is a schematic top elevation view of a shipping box containing a plurality of the key blank packaging assemblies of FIG. 1.

Referring now also to FIGS. 2 to 4, the sleeve 14 has a pair of opposed sidewalls 24 and a pair of opposed end walls 26. The sidewalls 24 and the end walls 26 are disposed perpendicularly to one another to circumscribe a blade receiving compartment 28. The sidewalls 24 includes two elongated walls 24a and 24b that extend longitudinally parallel to the stacking direction D, whereas the end walls 26 includes two walls 26a and 26b that extend perpendicularly to the direction D. The compartment 28 has a top opening 30 for receiving the key blanks blade portions 12b therein toward a bottom 32 of the sleeve 14. In the embodiment shown, the bottom 32 of the sleeve 14 is closed by a bottom wall 34 disposed perpendicularly to the sidewalls 24a, 24b and the end walls 26a, 26b of the sleeve 14. The sleeve 14 may of unitary construction. For instance, it could be molded from plastic or other suitable material. The sleeve 14 is configured for releasably retaining the key blank blade portions 12b in the compartment 28. For that purpose, friction and/or a mechanical engagement between the sleeve and the blade portions may be used. In a particular embodiment, the sleeve 14 has an opened bottom to allow the blade portions 12b to extend past a plane defined by the sleeve bottom 32.

In the embodiment shown, one wall 24b of the first set of opposed walls 24 has a lip 36 extending parallel to the stacking direction D and substantially along the entire length of the sleeve 14. The lip 36 is configured to engage the notches 22 of the key blank blade portions 12b to positively lock the key blanks in the sleeve and, thus, prevent accidental release of the key blanks 12 from compartment 28. In the embodiment shown, the lip wall 24b has a height H1 from the sleeve bottom 32 greater than a height H2 of remaining walls 24a, 26a and 26b such that the lip 36 is disposed above a plane of the compartment opening 30. The lip wall height H1 is selected as a function of the kind of key blanks to be received in the sleeve 12 as one will understand that the position of the notch is not necessarily the same for all kinds of key blanks. It is understood that the sleeve 14 is not limited to be used with key blanks having notches. The key blanks 12 may also be releasably retained within the sleeve compartment 28 by friction whether they have notches or not. For instance, the sidewalls 24 may be spring loaded or otherwise bias to releasably grasp the blade portions 12b of the key blanks 12. It is understood that the lip 36 may be omitted if, for example, the blade portions 12b do not include the notches.

Referring more particularly to FIGS. 2 and 3, the walls 26a and 26b define grooves 38 spaced apart from one another relative to the stacking direction D and extending from the compartment opening 30 toward the sleeve bottom 32. The grooves 38 are disposed adjacent the wall 24b defining the lip 36. The grooves 38 are configured to provide, or increase, a flexibility of said wall 24b so that the lip 36 may be disengaged from the key blank notches 22 to release the key blanks 12 from the sleeve 14 following a direction parallel to the longitudinal axis L (FIG. 1) of the key blank blade portions 12b. Stated otherwise, a width W1 of the grooves 38 may be increased to disengage the lip 36 from the notches 22. In a particular embodiment, the sleeve 14 does not define grooves.

In the embodiment shown, a ratio of depth d of the grooves 38 over the height H2 of the walls 26a and 26b varies based upon a size of the receiving magazine or dispenser and/or varies based upon a number of key blanks that is required. It is understood that the groove depth d may vary in function of a stiffness of the material of the sleeve 14. In a particular embodiment, only friction retains the key blade blank portions 12b within the sleeve 14 and the grooves 38 are omitted. Other configurations are contemplated as well.

Still referring to FIGS. 2 and 3, the walls 24a and 24b have tabs 40 protruding away from the compartment 28 and longitudinally extending parallel to the stacking direction D. The tabs 40 may be of a length corresponding to a length of the first set of opposed walls 24 as shown in FIG. 2 or may be shorter as shown in FIG. 1. The tabs 40 are configured to be engaged by the operator to spread apart the walls 24a, 24b of the compartment in order to facilitate the releasing of key blanks from the sleeve. According to one embodiment, a tab could only be provided on the wall 24b to facilitate the disengagement of the lip 36 from the notch 22 of the blade portions 12b of the key blanks 12. To release the key blank blade portions 12b, the operator would then pull the tab 40 in a direction parallel the longitudinal axis L of the key blanks 12 and away from their head portions 12a so as to increase the width W1 of the grooves 38, thereby causing the lip 36 to flex away from opposite wall 24a. According to another embodiment, a tab could be provided only on the wall 24a. It can be appreciated that the tabs 40 provide a gripping portion that may help the operator releasing the key blanks 12 from the sleeve 14 once the head portions 12a of the blanks 12 have been engaged in the channel of the key blank magazine.

Referring more particularly to FIG. 4, the walls 24a and 24b are concave relative to an exterior 42 of the compartment 28. Stated otherwise, the walls 24a and 24b of the first set 24 are concave when seen from the exterior 42 of the compartment 38. Therefore, a width W2 of the compartment 28 decreases along the stacking direction D from the walls 26a and 26b of the second set 26 toward a center point between said walls 26a and 26b when the key blank blade portions 12b are not received within the compartment 28. The walls 24a and 24b of the first set 24 are flexible such that they may become parallel to one another when the key blank blade portions 12b are inserted in the compartment 28. This configuration may help applying a more uniform pressure along all the stack of key blanks.

Referring to FIGS. 1 to 5, for packaging and shipping key blanks 12, the sleeve 14 having the two perpendicularly opposed sets of walls 24 and 26 that define the compartment 28 is first provided. Then, the key blank blade portions 12b are inserted in the compartment 28 to form a ready-to-load stack of key blanks. As illustrated, the key stack 16 is such that one of the two spaced-apart faces 18a and 18b of each of the key blanks 12 is facing one of two spaced-apart faces 18a and 18b of an adjacent one of the key blanks 12. As mentioned earlier, the stack 16 is releasably retained in the compartment 28 by the walls 24a, 24b, 26a, 26b. Then, the cartridge 10, including the key sleeve 14 and the stack of blanks, is inserted as one unit in a box 100 for shipment. The box 100 together with the loading cartridge 10 and it pre-stacked key blank contents form a new packaging assembly with ready to load stacks of key blanks.

In the illustrated embodiment, forming the packaging assembly further comprises pushing the key blanks 12 toward the sleeve bottom 32 until the lip 36 engages the notches 22 of the key blank blade portions 12b. It is understood that this step may be omitted if the key blanks do not have notches and the sleeve 14 does not have a lip 36. The key stack 16 may be formed before inserting the key blade blank portions 12b in the compartment 28. Hence, all key blank blade portions 12b of the key stack 16 may be inserted all in once in the compartment 28. In a particular embodiment, a shipping box 100 may contain more than one pre-formed stack of blanks. Therefore, a plurality of key blank cartridge 10 may be loaded in a same box 100 before being shipped to the customer (e.g. the operator of the automatic key cutting machine).

It can be appreciated that at least some of the combinations of features described above allow loading of a stack of key blanks as a single unit without resorting to any external tools. The operator only has to open the box of key blanks, withdraw a key blank sleeve and its content from the box and then engage the exposed head portion of the withdrawn pre-formed stack of key blanks in the vertical channel of the corresponding magazine or the dispenser before pulling the sleeve off the blade portion of the key blanks. From the foregoing, it can be appreciated that the packaging of the key blanks in a pre-stack configuration allows expediting the loading of the key blanks into the magazine and eliminate the need for any separate tools for holding the key blanks in a stack while loading same in the magazine. Once the sleeve has been removed from the key blanks, it can be recycled or returned to the key blank manufacturer for use in another key blank shipping package.

As can be understood, the examples described above and illustrated are intended to be exemplary only. The scope is indicated by the appended claims.

What is claimed is:

1. A packaging assembly for shipment of key blanks, comprising:
    a set of key blanks each having two faces spaced-apart by a thickness and defining a head portion and a blade portion; and
    a sleeve having first and second pairs of opposed walls circumscribing a key blank compartment in which the blade portions of the key blanks are releasably engaged, the sleeve holding the set of key blanks into a stack along a stacking direction parallel to the first pair of opposed walls, the key blanks in the stack serially aligned in a coplanar relationship along the stacking direction to have one of the two faces of each of the key blanks facing one of two faces of an adjacent one of the key blanks, wherein walls of the first pair of opposed walls are concave relative to an exterior of the compartment when the blade portions are not received in the compartment.

2. The packaging assembly of claim 1, wherein a wall of the first pair of opposed walls has a tab protruding away from the key blank compartment and longitudinally extending parallel to the stacking direction.

3. The packaging assembly of claim 1, wherein a wall of the first pair of opposed walls has a lip longitudinally extending parallel to the stacking direction and engaging notches of the key blanks when the blade portions are received in the key blank compartment.

4. The packaging assembly of claim 3, wherein the wall has a height relative to a bottom of the sleeve greater than a height of remaining walls of the first and second pairs of opposed walls.

5. The packaging assembly of claim 1, wherein walls of a second pair of opposed walls each define a groove extending from a top opening of the compartment toward a bottom of the compartment.

6. The packaging assembly of claim 1, wherein the key stack is retained within the compartment by friction between walls of the first and second pairs of opposed walls and the blade portions.

7. The packaging assembly of claim 1, further comprising a box, the sleeve with the stack of key blanks held therein being received in the box.

8. A packaging assembly for shipment of key blanks, comprising:
    a set of key blanks each having two faces spaced-apart by a thickness and defining a head portion and a blade portion; and
    a sleeve having first and second pairs of opposed walls circumscribing a key blank compartment in which the blade portions of the key blanks are releasably engaged, the sleeve holding the set of key blanks into a stack along a stacking direction parallel to the first pair of opposed walls, the key blanks in the stack serially aligned in a coplanar relationship along the stacking direction to have one of the two faces of each of the key blanks facing one of two faces of an adjacent one of the key blanks, wherein a wall of the first pair of opposed walls has a tab protruding away from the key blank compartment and longitudinally extending parallel to the stacking direction.

9. The packaging assembly of claim 8, wherein the wall of the first pair of opposed walls has a lip longitudinally extending parallel to the stacking direction and engaging notches of the key blanks when the blade portions are received the key blank compartment.

10. The packaging assembly of claim 8, wherein the wall has a height relative to a bottom of the sleeve greater than a height of remaining walls of the first and second pairs of opposed walls.

11. The packaging assembly of claim 8, wherein walls of a second pair of opposed walls each define a groove extending from a top opening of the compartment toward a bottom of the compartment.

12. The packaging assembly of claim 8, wherein walls of the first pair of opposed walls are concave relative to an exterior of the compartment when the blade portions are not received in the compartment.

13. The packaging assembly of claim 8, wherein the sleeve further includes a bottom wall disposed perpendicularly to walls of the first and second pairs of opposed walls.

14. The packaging assembly of claim 8, wherein the key stack is retained within the compartment by friction between walls of the first and second pairs of opposed walls and the blade portions.

15. A packaging assembly for shipment of key blanks, comprising:
    a set of key blanks each having two faces spaced-apart by a thickness and defining a head portion and a blade portion; and
    a sleeve having first and second pairs of opposed walls circumscribing a key blank compartment in which the blade portions of the key blanks are releasably engaged, the sleeve holding the set of key blanks into a stack along a stacking direction parallel to the first pair of opposed walls, the key blanks in the stack serially aligned in a coplanar relationship along the stacking direction to have one of the two faces of each of the key blanks facing one of two faces of an adjacent one of the key blanks, wherein:

a wall of the first pair of opposed walls has a lip longitudinally extending parallel to the stacking direction and engaging notches of the key blanks when the blade portions are received the key blank compartment; and the wall has a height relative to a bottom of the sleeve greater than a height of remaining walls of the first and second pairs of opposed walls.

16. The packaging assembly of claim 15, wherein the wall of the first pair of opposed walls has a tab protruding away from the key blank compartment and longitudinally extending parallel to the stacking direction.

17. The packaging assembly of claim 15, wherein walls of a second pair of opposed walls each define a groove extending from a top opening of the compartment toward a bottom of the compartment.

18. The packaging assembly of claim 15, wherein walls of the first pair of opposed walls are concave relative to an exterior of the compartment when the blade portions are not received in the compartment.

19. The packaging assembly of claim 15, wherein the sleeve further includes a bottom wall disposed perpendicularly to walls of the first and second pairs of opposed walls.

20. The packaging assembly of claim 15, wherein the key stack is retained within the compartment by friction between walls of the first and second pairs of opposed walls and the blade portions.

\* \* \* \* \*